United States Patent
Tucker et al.

(10) Patent No.: US 11,230,958 B2
(45) Date of Patent: Jan. 25, 2022

(54) INJECTOR SPRAY PROTECTOR

(71) Applicant: Faurecia Emissions Control Technologies, USA, LLC, Columbus, IN (US)

(72) Inventors: Alfred N. Tucker, Columbus, IN (US); Tomasz Kozakeiwicz, Columbus, IN (US); Syed Saleem Quadri, Columbus, IN (US); Jeffery Prairie, Franklin, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 36 days.

(21) Appl. No.: 16/348,202

(22) PCT Filed: Feb. 24, 2017

(86) PCT No.: PCT/US2017/019384
§ 371 (c)(1),
(2) Date: May 8, 2019

(87) PCT Pub. No.: WO2018/156146
PCT Pub. Date: Aug. 30, 2018

(65) Prior Publication Data
US 2019/0323402 A1 Oct. 24, 2019

(51) Int. Cl.
*F01N 3/28* (2006.01)
*B01F 3/04* (2006.01)
*B01F 5/00* (2006.01)

(52) U.S. Cl.
CPC ........ *F01N 3/2892* (2013.01); *B01F 3/04049* (2013.01); *B01F 2005/0091* (2013.01);
(Continued)

(58) Field of Classification Search
CPC .............. F01N 3/2892; F01N 2610/02; F01N 2610/1453; B01F 2005/0091; B01F 3/04049
See application file for complete search history.

(56) References Cited

U.S. PATENT DOCUMENTS

| | | | |
|---|---|---|---|
| 8,438,839 B2 * | 5/2013 | Floyd .................. | B01F 3/04049 60/286 |
| 8,756,921 B2 * | 6/2014 | Troxler ................ | F01N 3/2066 60/295 |

(Continued)

FOREIGN PATENT DOCUMENTS

| CN | 103210192 A | 7/2013 |
|---|---|---|
| CN | 106414931 A | 2/2017 |

(Continued)

OTHER PUBLICATIONS

Transmittal of International Preliminary Report on Patentability with regards to PCT/US2017/019384.
(Continued)

*Primary Examiner* — Ngoc T Nguyen
(74) *Attorney, Agent, or Firm* — Carlson, Gaskey & Olds, P.C.

(57) ABSTRACT

A vehicle exhaust system includes an injector assembly having an injector mount configured to mount an injector to an exhaust component. The injector mount includes a spray opening surrounding a spray axis. An injector housing extends from an inlet end that receives exhaust gases to an outlet end. The inlet end defines a planar area that is transverse to the spray axis. A spray protector extends axially from the injector mount to break the planar area. A vehicle exhaust component assembly comprising a mixer with the injector assembly and a method for injecting a fluid into an exhaust component using the injector assembly are also disclosed.

27 Claims, 7 Drawing Sheets

(52) U.S. Cl.
CPC ...... *F01N 2240/20* (2013.01); *F01N 2610/02* (2013.01); *F01N 2610/146* (2013.01); *F01N 2610/1453* (2013.01)

(56) References Cited

U.S. PATENT DOCUMENTS

| | | | |
|---|---|---|---|
| 9,140,163 | B2 | 11/2015 | Loman |
| 9,266,075 | B2 | 2/2016 | Chapman et al. |
| 9,341,100 | B2 | 5/2016 | Petry |
| 9,581,067 | B2 | 2/2017 | Guilbaud et al. |
| 9,714,598 | B2 | 7/2017 | Alano et al. |
| 9,726,064 | B2 | 8/2017 | Alano |
| 9,737,907 | B2 | 8/2017 | Hornback et al. |
| 9,737,908 | B2 | 8/2017 | Hornback et al. |
| 9,828,897 | B2 | 11/2017 | Alano |
| 9,995,193 | B2 | 6/2018 | Alano et al. |
| 10,174,658 | B2 * | 1/2019 | Dimpelfeld ........... B01F 5/0057 |
| 10,190,465 | B2 | 1/2019 | Alano et al. |
| 10,215,075 | B2 | 2/2019 | Alano et al. |
| 10,227,907 | B2 | 3/2019 | Alano et al. |
| 2002/0084218 | A1 | 7/2002 | Illingworth |
| 2012/0144812 | A1 | 6/2012 | Hyun |
| 2013/0340417 | A1 | 12/2013 | Morey et al. |
| 2014/0237998 | A1 * | 8/2014 | Fahrenkrug ........... F01N 3/2066 60/301 |
| 2014/0345257 | A1 | 11/2014 | Levin et al. |
| 2015/0101313 | A1 * | 4/2015 | Mitchell ............... F01N 3/2892 60/274 |
| 2016/0084133 | A1 | 3/2016 | Sampath et al. |
| 2016/0251990 | A1 | 9/2016 | Dimpelfeld et al. |
| 2016/0319723 | A1 * | 11/2016 | Alano ................ B01F 3/04049 |
| 2016/0319724 | A1 * | 11/2016 | Alano .................... F01N 3/208 |
| 2017/0022870 | A1 | 1/2017 | Chapman et al. |
| 2018/0142597 | A1 | 5/2018 | Riepshoff et al. |
| 2019/0010850 | A1 | 1/2019 | Willats et al. |
| 2019/0063291 | A1 | 2/2019 | Ker et al. |
| 2020/0173330 | A1 * | 6/2020 | Tucker ..................... B01F 5/00 |

FOREIGN PATENT DOCUMENTS

| | | | | |
|---|---|---|---|---|
| GB | 2512934 | A * | 10/2014 | ......... B01F 3/04049 |
| WO | 2015187128 | A1 | 12/2015 | |
| WO | 2016036298 | A1 | 3/2016 | |
| WO | 2018222180 | A1 | 12/2018 | |
| WO | 2019045748 | A1 | 3/2019 | |

OTHER PUBLICATIONS

International Search Report and Written Opinion for PCT Application No. PCT/US2017/019384, dated Nov. 23, 2017.

* cited by examiner

INJECTOR SPRAY PROTECTOR

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixing area at the injection site, which creates deposit initiation sites along the walls. The deposits build up over time and can adversely affect system operation. For example, there may be a lower ammonia uniformity index, there may be an increased pressure drop across the mixer, or higher ammonia emissions during active diesel particulate filter (DPF) regeneration.

SUMMARY OF THE INVENTION

In one exemplary embodiment, a vehicle exhaust system includes an injector assembly having an injector mount configured to mount an injector to an exhaust component. The injector mount includes a spray opening surrounding a spray axis. An injector housing extends from an inlet end that receives exhaust gases to an outlet end. The inlet end defines a planar area that is transverse to the spray axis. A spray protector extends axially from the injector mount to break the planar area.

In a further embodiment of the above, the spray protector is held fixed to the injector mount and extends to a distal end that extends axially beyond the planar area.

In a further embodiment of any of the above, the injector housing comprises a cone with the inlet end having a smaller diameter than the outlet end, and wherein the injector mount comprises a base plate including the spray opening configured to receive fluid from the injector, and wherein the base plate has a first surface facing the cone, and wherein the spray protector comprises a tubular member that surrounds the spray opening and extends axially away from the first surface to a distal end that extends axially beyond the planar area.

In another exemplary embodiment, a vehicle exhaust component assembly comprises a mixer shell defining a mixer center axis, and wherein the mixer shell includes a mixer opening formed in an outer surface of the mixer shell. An upstream mixer baffle is positioned within the mixer shell and a downstream mixer baffle is positioned within the mixer shell to be spaced axially from the upstream mixer baffle in a direction along the mixer center axis. An injector mount is held fixed relative to the mixer shell and includes a spray opening that surrounds a spray axis and is aligned within the mixer opening. An injector housing extends from an inlet end that receives exhaust gases to an outlet end, and wherein the inlet end defines a planar area that intersects the spray axis. A spray protector extends axially from the injector mount to a distal end that extends axially beyond the planar area in a direction along the spray axis.

In a further embodiment of any of the above, the injector mount comprises a base plate that includes the spray opening which is configured to receive fluid from an injector. The base plate has a first surface facing the cone and the spray protector comprises a tubular member that surrounds the spray opening and extends axially away from the first surface to the distal end that extends axially beyond the planar area In another exemplary embodiment, a method for injecting a fluid into an exhaust component includes the steps of: providing an injector mount configured to mount an injector to an exhaust component, the injector mount including a spray opening surrounding a spray axis; positioning an injector housing adjacent to the injector mount, the injector housing extending from an inlet end that receives exhaust gases to an outlet end, and wherein the inlet end defines a planar area that intersects the spray axis; and providing a spray protector that extends axially from the injector mount to a distal end that extends axially beyond the planar area in a direction along the spray axis such that spray exiting the distal end of the spray protector mixes with exhaust gases entering the inlet end of the injector housing.

In a further embodiment of any of the above, the spray protector is integrally formed with the base plate as a single-piece component.

These and other features of this application will be best understood from the following specification and drawings, the following of which is a brief description.

DETAILED DESCRIPTION

Figure 1:
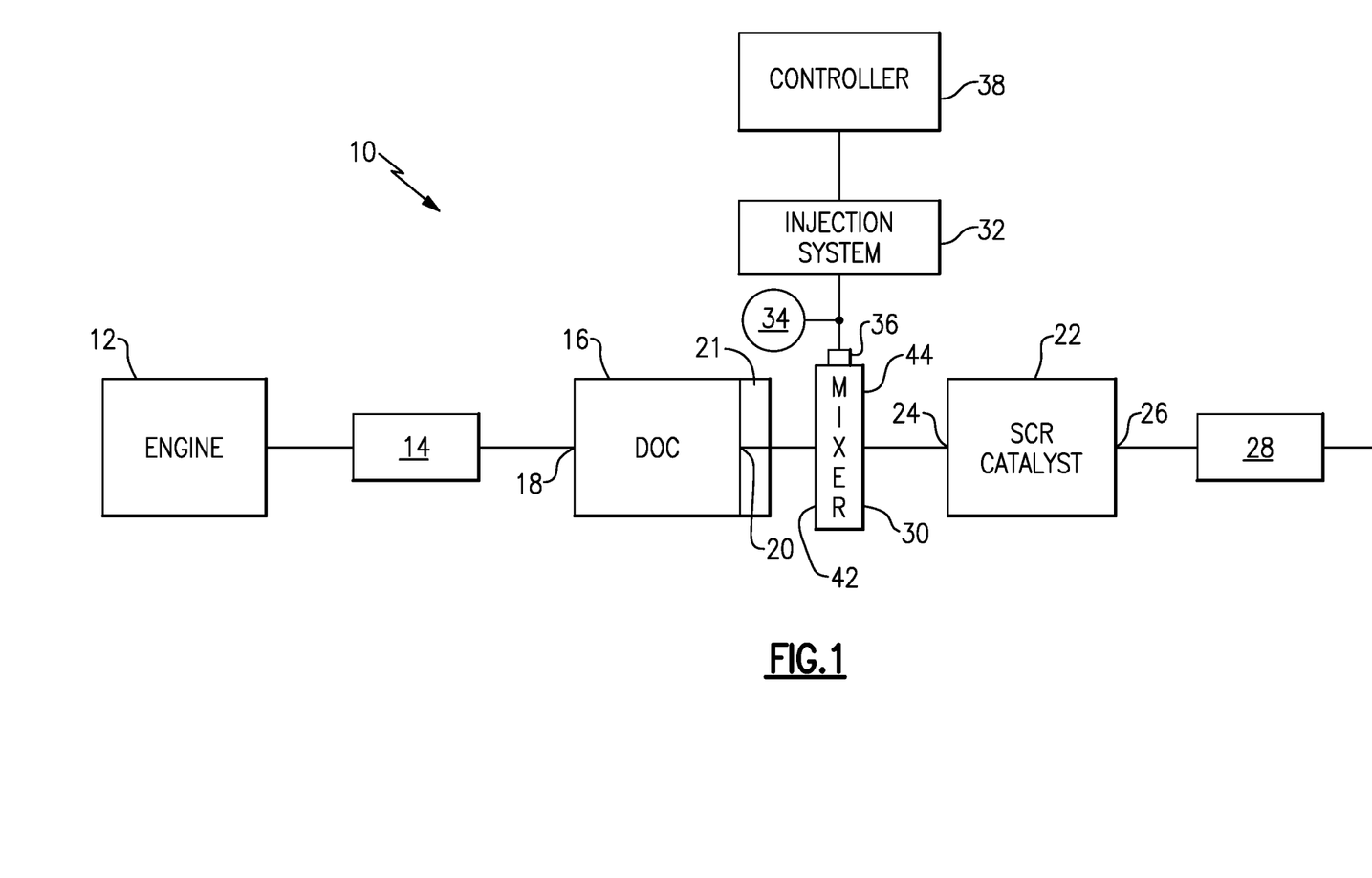
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: exhaust pipes, filters, valves, catalysts, mufflers etc.

In one example configuration, the exhaust components include an exhaust tube or pipe 14 that directs engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: exhaust pipes, filters, valves, catalysts, mufflers etc. These upstream 14 and downstream 28 components can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a fluid reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser or injector 36, and a controller 38 that controls injection of the urea as known.

The mixer 30 comprises a mixer body having an upstream or inlet end 42 configured to receive the engine exhaust gases and a downstream or outlet end 44 to direct a mixture of swirling engine exhaust gas and products transformed from urea to the SCR catalyst 22. Examples of a mixer 30 that can be used in the exhaust system 10 can be found in US 2012/0216513 and co-pending U.S. application Ser. No. 12/57,693, U.S. application Ser. No. 12/57,886, and U.S. application Ser. No. 12/57,768 which are also assigned to the assignee of the present application and are hereby incorporated by reference.

Figure 2:
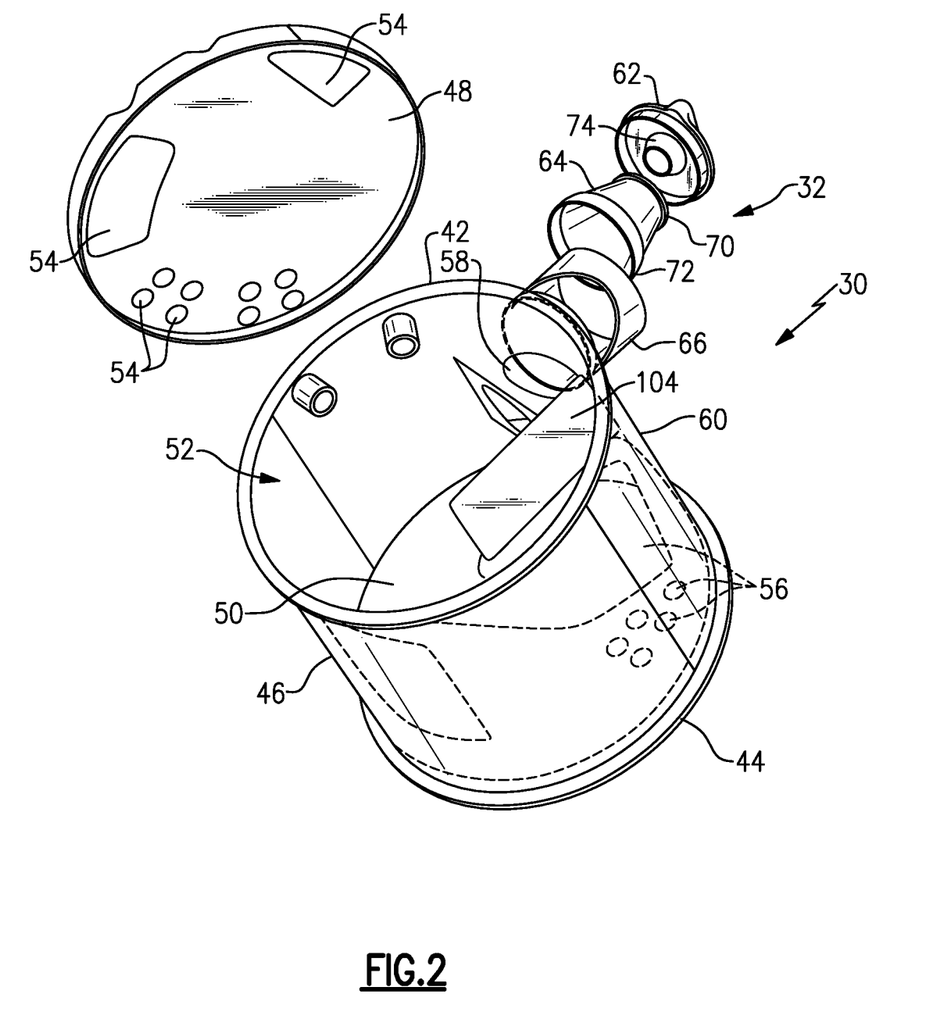
FIG. 2 is an exploded view of an upstream end of a mixer with an injection assembly that includes the subject invention.
Figure 3:
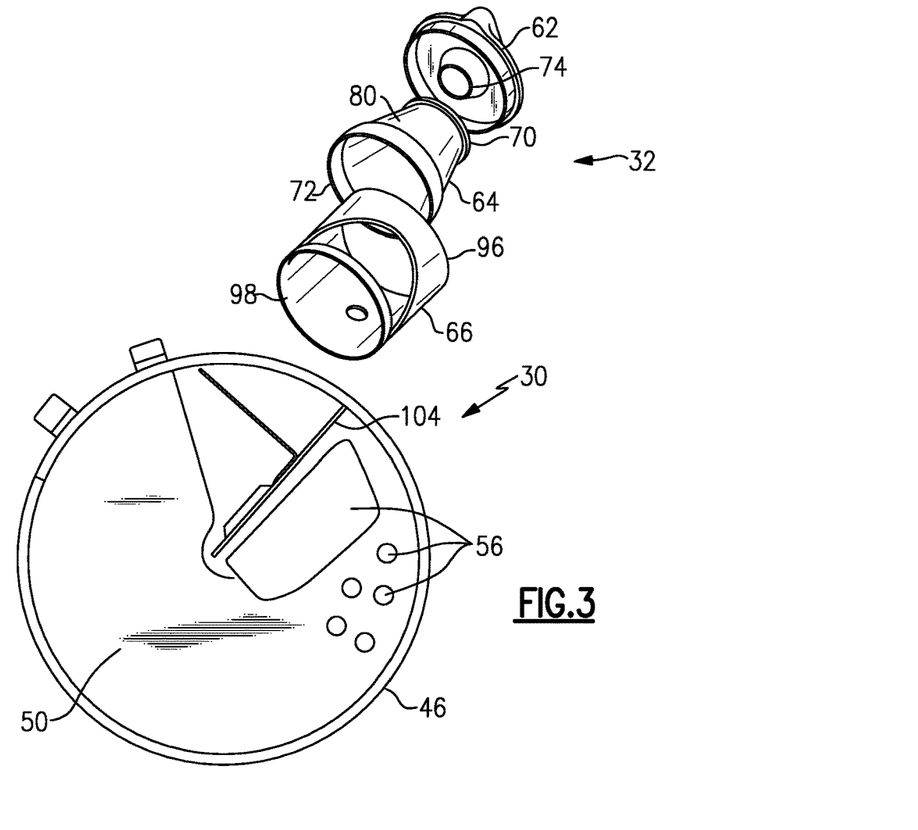
FIG. 3 is an exploded view of a downstream end of the mixer of FIG. 2.
Figure 4:
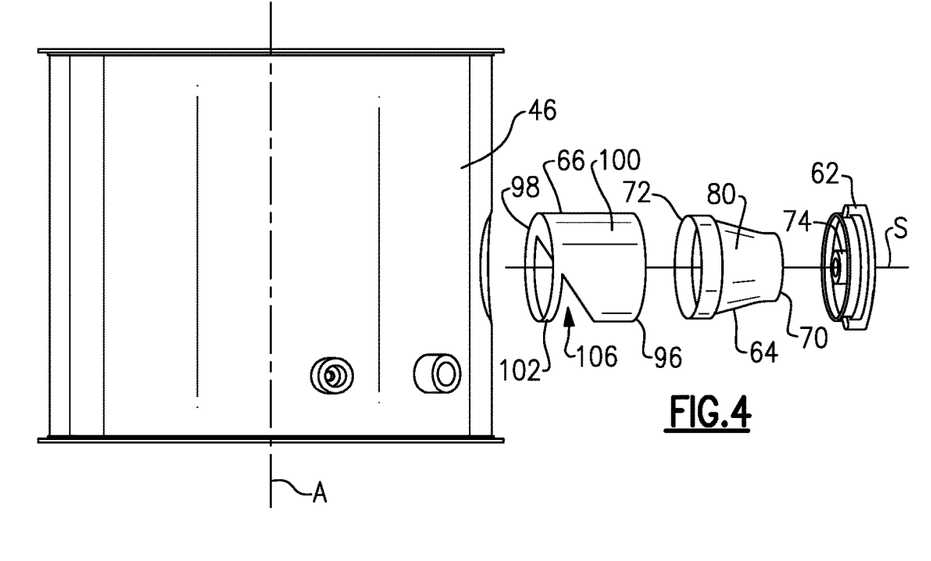
FIG. 4 is an exploded view of one side of the mixer of FIG. 2.
Figure 5:
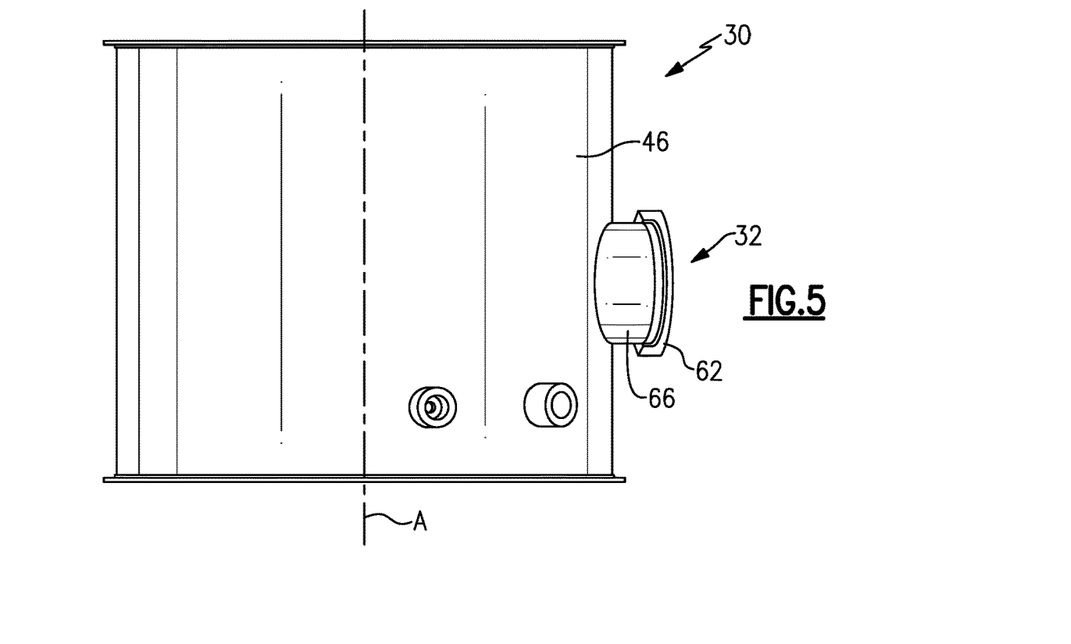
FIG. 5 is a side view of the mixer as assembled.

As shown in FIGS. 2-4, the mixer 30 includes an outer shell 46, an upstream or inlet baffle 48, and a downstream or outlet baffle 50. The outer shell 46 defines a mixer central axis A that extends in a direction from the upstream end 42 to the downstream end 44. The upstream baffle 48 is mounted within an internal cavity 52 of the outer shell 46 and includes a plurality of openings 54 through which hot engine exhaust gases enter the mixer 30. The downstream baffle 50 is mounted within the internal cavity 52 and includes a plurality of openings 56 through which a mixture of the engine exhaust gases and reducing agent exit the mixer 30.

Figure 6:
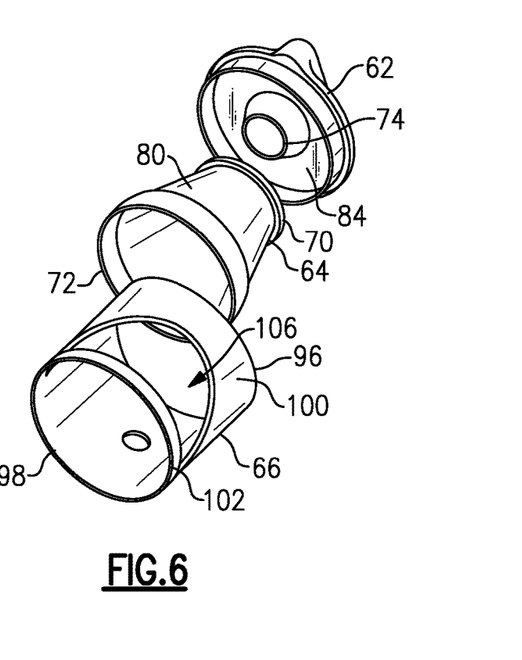
FIG. 6 is an exploded view of the injection assembly of FIG. 2.
Figure 7:
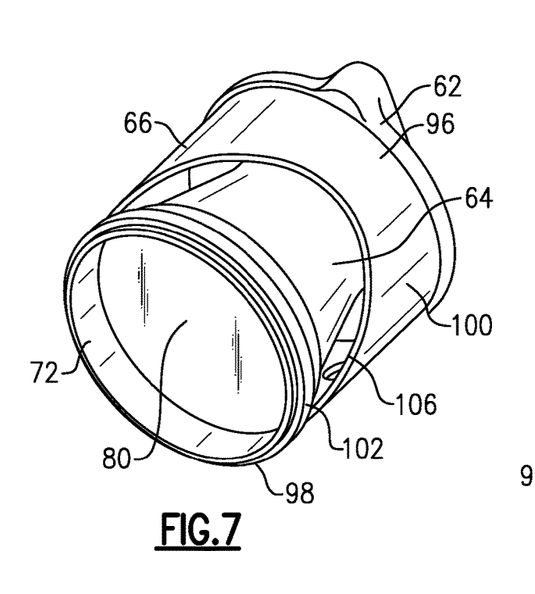
FIG. 7 is a perspective view of the injection assembly as assembled.

The injection system 32 is mounted at an opening 58 formed in an outer peripheral surface 60 of the outer shell 46. In one example configuration, the injection system 32 (FIGS. 6-7) includes an injector mount 62 configured to mount the injector 36 to the mixer 30, an injector housing 64, and an outer housing 66 that at least partially surrounds the injector housing 64. The injector mount 62 includes a spray opening 68 (FIG. 10) surrounding a spray axis S. In one example, the opening 58 in the outer shell 56 defines a center axis that is concentric with the spray axis S. The injector housing 64 extends from an inlet end 70 that receives exhaust gases to an outlet end 72. The inlet end 70 defines a planar area P (FIGS. 3 and 10) that is transverse to the spray axis S. In one example, the spray axis S is perpendicular to the planar area P. A spray protector 74 extends axially from the injector mount 62 to break through or intersect the planar area P.

Figure 10:
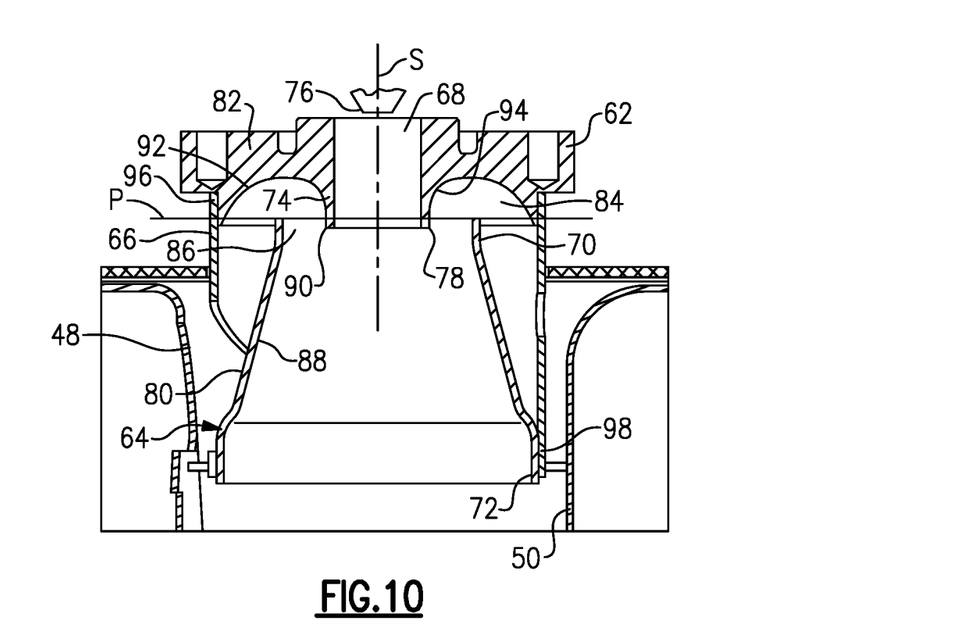
FIG. 10 is a section view of the injection assembly with an outer housing.

As shown in FIG. 10, a tip 76 of the injector 36 is configured to spray the fluid reducing agent into the spray opening 68 of the injector mount 62. The spray protector 74 has a first end held fixed to the injector mount 62 and a second end or distal end 78 that extends axially beyond the planar area P in a direction along the spray axis S. In one example, the distal end 78 extends at least 1-2 mm axially beyond the planar area P.

In the example shown, the spray protector 74 is integrally formed as a single-piece component with the injector mount 62. Optionally, the spray protector 74 can comprise a separate component that is attached to the injector mount 62.

The injector housing 64 is positioned within the internal cavity 52 at a position that is between the upstream 48 and downstream 50 baffles. In one example, the injector housing 64 comprises a cone 80 where the base or inlet end 70 has a smaller diameter than the outlet end 72. The injector mount 62 comprises a base plate 82 that includes the spray opening 68 and which has a first surface 84 facing the cone 80. The spray protector 74 comprises a tubular member that surrounds the spray opening 68 and extends axially away from the first surface 84 to the distal end 78 that extends axially beyond the planar area P.

The inlet end 70 of the cone 80 is positioned adjacent the spray opening 68 such that an annular gap 86 is formed between an inner surface 88 of the cone 80 and an outer surface 90 of the distal end 76 of the spray protector 74. Exhaust gas is directed into the inlet end 70 of the cone 80 through the annular gap 86. The first surface 84 of the base plate 82 includes a curved portion 92 extending radially outwardly of the inlet end 70 of the cone 80 to facilitate directing exhaust gases into the annular gap 86. Spray exits the distal end 76 of the spray protector 74 and mixes with the exhaust gases within the cone 80. The mixture of fluid spray and exhaust gas then exits the cone 80 via the outlet end 72.

In one example, the spray protector 74 is integrally formed with the base plate 82 as a single-piece component. In this example, the base plate 82 includes a curved transition surface 94 that extends from the first surface 84 to the outer surface 90 of the spray protector 74. This curved transition surface 94 further facilitates the flow of exhaust gas into the annular gap 86.

Figure 8:
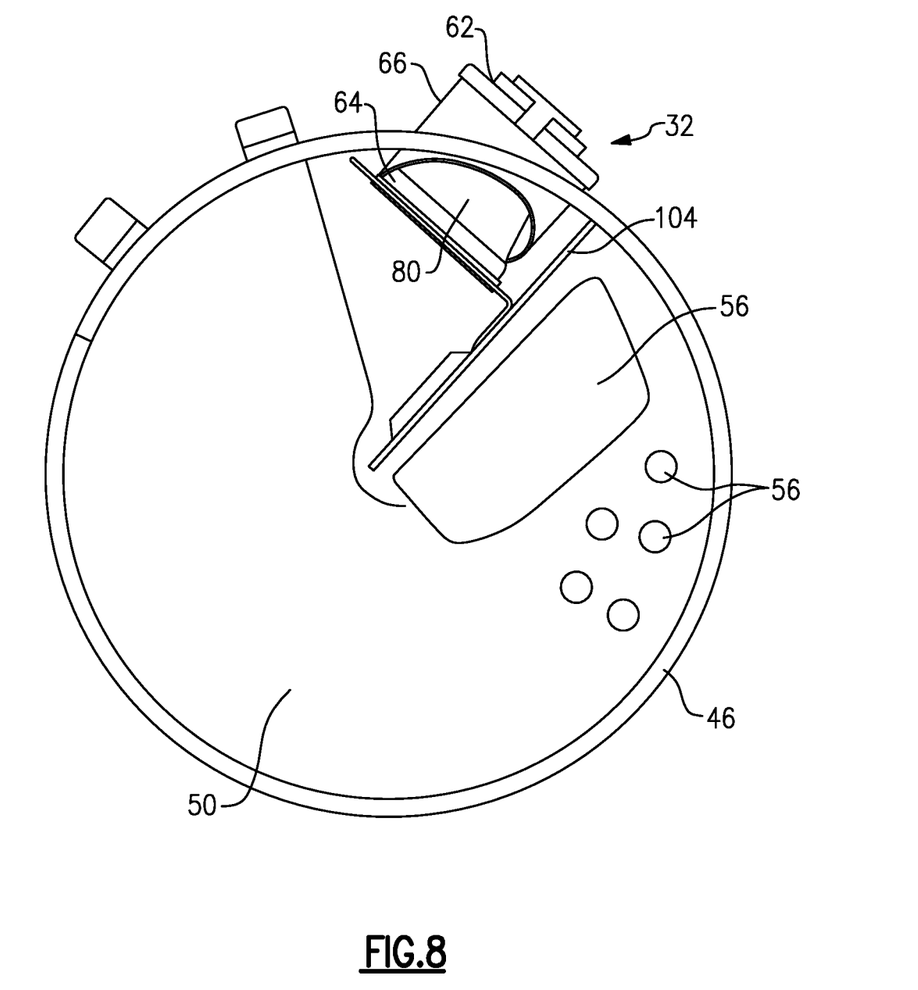
FIG. 8 is a downstream end view of the mixer of FIG. 5.

In one example, the outer housing 66 is positioned within the internal cavity 52 to at least partially surround the cone 80. The outer housing 66 directs exhaust gas flow toward the inlet end 70 of the cone 80. In one example, the outer housing 66 includes a first end 96 and a second end 98. The first end 96 is attached to the injector mount 62 at a location radially outwardly of the curved portion 92 (FIG. 10). The first end 96 comprises a tubular portion 100 that completely surrounds the inlet end 70 of the cone 80. The second end 98 includes a ring portion 102 that attaches to a bracket 104 (FIGS. 2 and 8) to facilitate mounting of the cone 80 and housing 66 to the outer shell 46. A large open area 106 is formed in the outer housing 66 between the ring portion 102 and the tubular portion 100. In one example, the open area 106 extends about at least half of the circumference of the outer housing 66.

Figure 11:
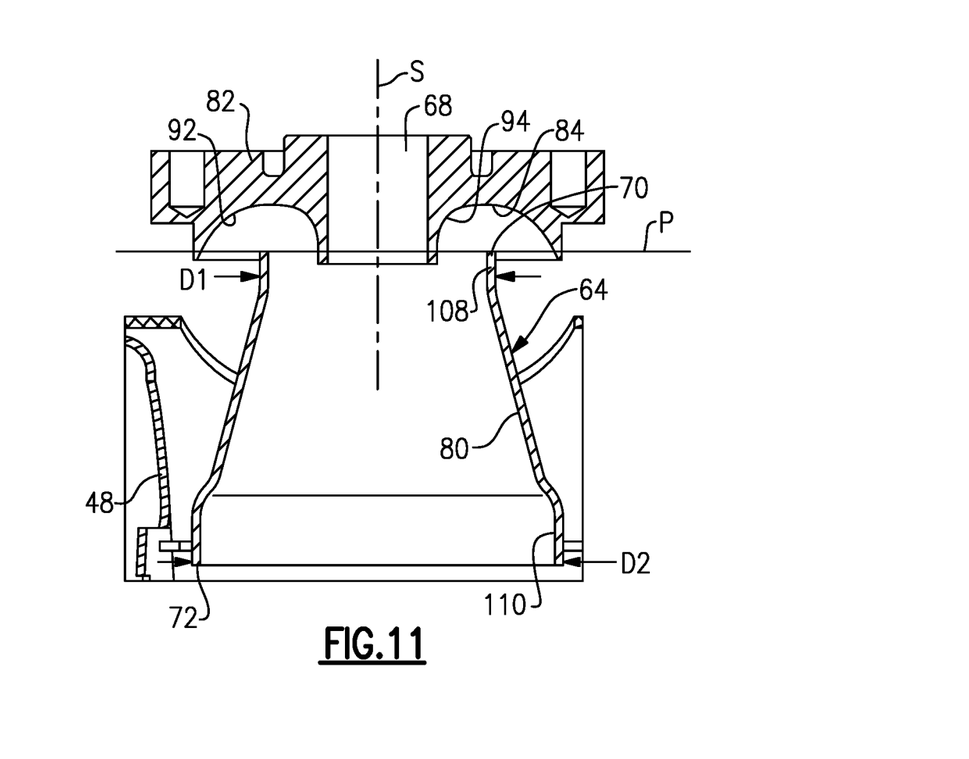
FIG. 11 is a section view of the injection assembly without the outer housing.

As shown in FIG. 10, exhaust gases enter through this open area 106 and are directed to the inlet end 70 of the cone 80. FIG. 11 shows an example without the outer housing 66. In a configuration without the outer housing 66, the injector mount 62 can be configured to mount to the outer shell 46 to direct exhaust gases into the annular gap 86.

As shown in FIG. 11, the inlet end 70 of the cone 80 has a tubular section 108 of a generally constant diameter D1 and the outlet end 72 includes a tubular section 110 that is defined by a generally constant diameter D2 that is greater than D1. The cone 80 tapers continuously outwardly from the tubular section 108 to the tubular section 110. In one example, the cone 80 is concentric with the spray axis S.

The shell 46 of the mixer 30 and the baffles 48, 50 can be made from any material suitable for use in a vehicle exhaust system and can be cast, stamped, machined, etc. The injector mount 62 and cone 80 can also be made from any material suitable for use in a vehicle exhaust system and can be cast, stamped, machined, etc. Further, while the spray protector 74 is shown as having a tubular shape, the protector could also have different geometries and could have flared end portions or other shaped features at the distal end to further facilitate mixing of the spray into the exhaust gas. Additionally, while the injector housing 64 is shown as having a cone shape, other shapes and geometries could also be used such as a straight cylinder, square tube, etc. The shape and surfaces of the injector mount 62 could also be modified as needed to further facilitate directing exhaust gas flow into the injector housing 64.

The exhaust gas is directed to enter the inlet end 70 of the cone 80 in an evenly distributed manner about the spray protector 74. The curved surface portion 92 of the injector mount 62 directs the exhaust gases in a direction that is transverse to the spray axis S. The curved transition surface 94 and the spray protector 74 then direct the exhaust gases into the annular gap 86 to flow in a direction that is generally common with the spray axis S. The spray protector 74 protects the spray from being hit by transversely flowing exhaust gases upon exiting the injector mount 62, which prevents urea deposits from forming on the walls adjacent to the inlet end 70 of the cone 80. The spray exits the spray protector 74 in a direction that is generally common with the flow of the exhaust gases such that the spray and exhaust gas can thoroughly mix together.

Figure 9:
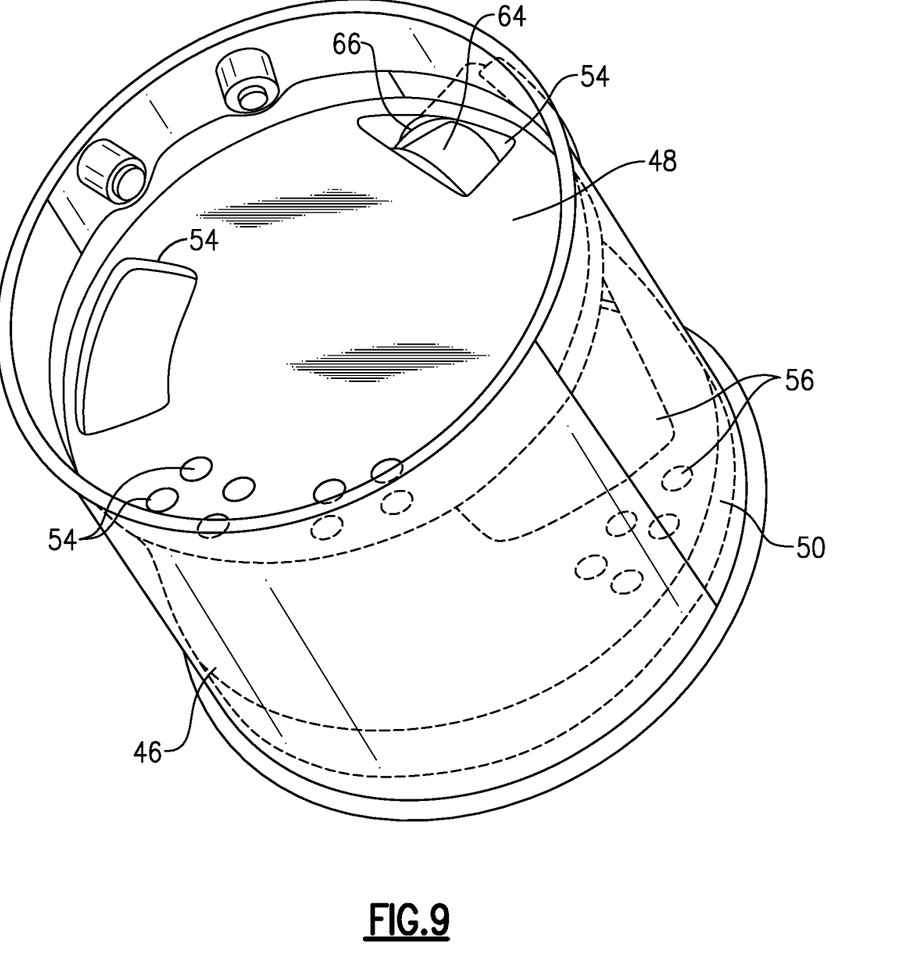
FIG. 9 is an upstream perspective view of the mixer of FIG. 5.

As shown in FIGS. 10-11, the injection system 32 is positioned between the inlet baffle 48 and an outlet baffle 50 of the mixer 30. The inlet baffle 48 is at the upstream end 42 of the mixer 30 and is configured to initiate swirling of the primary exhaust gas flow through the mixer 30. In one example, the inlet baffle 48 includes one or more large or primary inlet openings (FIGS. 2 and 9) that receive a majority of the exhaust gas, and which facilitate the initiation of the swirling motion of the exhaust gases. The inlet baffle 48 also includes a plurality of perforations, slots, or additional inlet openings of a smaller size that ensure optimal homogenization of exhaust gases and reduce back pressure.

The outlet baffle 50 is at the downstream end 44 of the mixer 30 and includes one or more large or primary outlet openings (FIGS. 3 and 8) through which a majority of the exhaust gas exits the mixer 30. The outlet baffle 50 also includes a plurality of perforations, slots, or additional outlet openings of a smaller size that facilitate uniform exit flow.

Traditional injection systems have urea deposits forming in an injector spray area which can adversely affect operation of the mixer assembly. The subject invention protects the injector spray from exhaust gas crossflow by using the injector spray protector 74 as a shield when the spray transitions from the injector tip 76, through the tubular spray protector 74 and into the expansion cone 80. Flow from the exhaust must turn approximately 180 degrees in order to enter the spray cone inlet end 70 and then exit the spray cone outlet end 72. Spray from the injector 36 must transition from the tip 76, through the spray protector 74 in the injector mount 62, and into the spray cone 80. The spray is mixed with the exhaust flow inside of the spray cone 80 as it travels through and exits the spray cone 80. The injector spray protector 74 protects the spray from the injector as it traverses the gap 86 between the injector mount 62 and the inlet end 70 of the spray cone 80. As exhaust velocity is increased, the injector spray protector 74 continues to protect the injector spray, thus eliminating the potential for spray deflection inside the device which can cause deposit formation. By extending the injector spray protector 74 through the plane P created by the inlet opening of the spray cone 80, the adverse effects of crossflow are eliminated.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An injector assembly for a vehicle exhaust component comprising:
   an injector mount configured to mount an injector to the vehicle exhaust component, wherein the injector mount includes a spray opening surrounding a spray axis;
   an injector housing extending from an inlet end that receives exhaust gases to an outlet end, and wherein the inlet end defines a planar area that is transverse to the spray axis; and
   a spray protector extending axially from the injector mount to break the planar area.

2. The injector assembly according to claim 1, wherein the spray protector is held fixed to the injector mount and extends to a distal end that extends axially beyond the planar area.

3. The injector assembly according to claim 2, wherein the vehicle exhaust component comprises a mixer defining an internal cavity where engine exhaust gas is mixed with fluid spray exiting the spray opening, and wherein the injector housing comprises a cone that is positioned within the internal cavity.

4. The injector assembly according to claim 3, wherein the mixer includes an opening in an outer peripheral surface defining a center axis, and wherein the center axis and spray axis are concentric.

5. The injector assembly according to claim 3, including an upstream baffle positioned within the internal cavity and a downstream baffle axially spaced from the upstream baffle, and wherein the cone is positioned between the upstream and downstream baffles.

6. The injector assembly according to claim 1, wherein the injector housing comprises a cone with the inlet end having a smaller diameter than the outlet end, and wherein the injector mount comprises a base plate including the spray opening configured to receive fluid from the injector, and wherein the base plate has a first surface facing the cone, and wherein the spray protector comprises a tubular member that surrounds the spray opening and extends axially away from the first surface to a distal end that extends axially beyond the planar area.

7. The injector assembly according to claim 6, wherein the inlet end of the cone is positioned adjacent the spray opening such that an annular gap is formed between an inner surface of the cone and an outer surface of the distal end of the spray protector, and wherein exhaust gas is directed into the inlet end of the cone through the annular gap that forms an exhaust gas passage through which the planar area extends.

8. The injector assembly according to claim 7, wherein the first surface of the base plate includes a curved portion extending radially outwardly of the inlet end of the cone to facilitate directing exhaust gases into the annular gap.

9. The injector assembly according to claim 7, wherein the spray protector is integrally formed with the base plate as a single-piece component, and wherein the base plate includes a curved transition surface extending from the first surface to the outer surface of the spray protector.

10. The injector assembly according to claim 6, including an outer housing at least partially surrounding the cone, and wherein the outer housing directs exhaust gas flow toward the inlet end of the cone.

11. The injector assembly according to claim 6, including an upstream baffle and a downstream baffle, and wherein the outer housing and cone are positioned in an area between the upstream and downstream baffles.

12. A vehicle exhaust component assembly comprising:
a mixer shell defining a mixer center axis, the mixer shell including a mixer opening formed in an outer surface of the mixer shell;
an upstream mixer baffle positioned within the mixer shell;
a downstream mixer baffle positioned within the mixer shell and spaced axially from the upstream mixer baffle in a direction along the mixer center axis;
an injector mount held fixed relative to the mixer shell, and wherein the injector mount includes a spray opening surrounding a spray axis and aligned within the mixer opening;
an injector housing extending from an inlet end that receives exhaust gases to an outlet end, and wherein the inlet end defines a planar area that intersects the spray axis; and
a spray protector extending axially from the injector mount to a distal end that extends axially beyond the planar area in a direction along the spray axis.

13. The vehicle exhaust component assembly according to claim 12, wherein the injector housing comprises a cone with the inlet end having a smaller diameter than the outlet end, and wherein the injector mount comprises a base plate including the spray opening configured to receive fluid from an injector, and wherein the base plate has a first surface facing the cone, and wherein the spray protector comprises a tubular member that surrounds the spray opening and extends axially away from the first surface to the distal end that extends axially beyond the planar area.

14. The vehicle exhaust component assembly according to claim 13, wherein the inlet end of the cone is positioned adjacent the spray opening such that an annular gap is formed between an inner surface of the cone and an outer surface of the distal end of the spray protector, and wherein exhaust gas is directed into the inlet end of the cone through the annular gap that forms an exhaust gas passage through which the planar area extends.

15. The vehicle exhaust component assembly according to claim 13, wherein the spray protector is integrally formed with the base plate as a single-piece component.

16. A method for injecting a fluid into an exhaust component comprising the steps of:

providing an injector mount configured to mount an injector to the exhaust component, the injector mount including a spray opening surrounding a spray axis;
positioning an injector housing adjacent to the injector mount, the injector housing extending from an inlet end that receives exhaust gases to an outlet end, and wherein the inlet end defines a planar area that intersects the spray axis; and
providing a spray protector that extends axially from the injector mount to a distal end that extends axially beyond the planar area in a direction along the spray axis such that spray exiting the distal end of the spray protector mixes with exhaust gases entering the inlet end of the injector housing.

17. The method according to claim 16, including providing the injector housing as a cone where the inlet end has a diameter that is less than a diameter of the outlet end, and including providing an outer housing that at least partially surrounds the cone, and wherein the outer housing includes a first end attached to the injector mount and a second end that includes a ring portion, and wherein the first end comprises a tubular portion that completely surrounds the inlet end of the cone, and including forming an open area in the outer housing between the ring portion and the tubular portion that extends partially about a circumference of the outer housing such that the exhaust gases enter through the open area and are directed to the inlet end of the cone.

18. The method according to claim 17, including forming the injector mount to comprise a base plate including the spray opening which is configured to receive fluid from the injector, and wherein the base plate has a first surface facing the cone, and wherein the first surface curves from a first location at a radially outward edge of the base plate to a second location at the distal end of the spray protector, and wherein the first location and the distal end are on a common side of the planar area, and including forming the spray protector to comprise a tubular member that surrounds the spray opening and extends axially away from the first surface to the distal end that extends axially beyond the planar area.

19. The method according to claim 18, including positioning the inlet end of the cone adjacent the spray opening such that an annular gap is formed between an inner surface of the cone and an outer surface of the distal end of the spray protector, and directing exhaust gas into the inlet end of the cone through the annular gap that forms an exhaust gas passage through which the planar area extends.

20. The method according to claim 18, including integrally forming the spray protector with the base plate as a single-piece component.

21. The method according to claim 16, wherein the exhaust component comprises a mixer that defines an internal cavity, and including positioning the injector housing within the internal cavity and directing the exhaust gases along an outer surface of the spray protector to the distal end that breaks the planar area such that the spray protector defines a portion of an exhaust gas passage between an inner surface of the injector housing and the outer surface of the distal end.

22. The vehicle exhaust component assembly according to claim 12, wherein the exhaust gases are directed along an outer surface of the spray protector to the distal end that breaks the planar area such that the spray protector defines a portion of an exhaust gas passage between an inner surface of the injector housing and the outer surface of the distal end.

23. The vehicle exhaust component assembly according to claim 13, wherein the first surface curves from a first location at a radially outward edge of the base plate to a second location at the distal end of the spray protector, and wherein the first location and the distal end are on a common side of the planar area.

24. The vehicle exhaust component assembly according to claim 12, including an outer housing that at least partially surrounds the injector housing, and wherein the outer housing includes a first end attached to the injector mount and a second end that includes a ring portion, and wherein the first end comprises a tubular portion that completely surrounds the inlet end of the injector housing, and including an open area formed in the outer housing between the ring portion and the tubular portion that extends partially about a circumference of the outer housing, and wherein the exhaust gases enter through the open area and are directed to the inlet end of the injector housing.

25. The injector assembly according to claim 1, wherein the exhaust gases are directed along an outer surface of the spray protector to a distal end that breaks the planar area such that the spray protector defines a portion of an exhaust gas passage between an inner surface of the injector housing and the outer surface of the distal end.

26. The injector assembly according to claim 25, wherein the injector mount includes a base plate with a first surface facing the injector housing, and wherein the first surface curves from a first location at a radially outward edge of the base plate to a second location at the distal end of the spray connector, and wherein the first location and the distal end are on a common side of the planar area.

27. The injector assembly according to claim 25, including an outer housing that at least partially surrounds the injector housing, and wherein the outer housing includes a first end attached to the injector mount and a second end that includes a ring portion, and wherein the first end comprises a tubular portion that completely surrounds the inlet end of the injector housing, and including an open area formed in the outer housing between the ring portion and the tubular portion that extends partially about a circumference of the outer housing, and wherein the exhaust gases enter through the open area and are directed to the inlet end of the injector housing.

* * * * *

UNITED STATES PATENT AND TRADEMARK OFFICE
CERTIFICATE OF CORRECTION

PATENT NO. : 11,230,958 B2
APPLICATION NO. : 16/348202
DATED : January 25, 2022
INVENTOR(S) : Alfred N. Tucker et al.

It is certified that error appears in the above-identified patent and that said Letters Patent is hereby corrected as shown below:

In the Claims

In Claim 11, Column 7, Line 21; replace "claim 6" with --claim 10--

In Claim 26, Column 10, Lines 5-6; replace "the spray connector" with --the spray protector--

Signed and Sealed this
Tenth Day of May, 2022

Katherine Kelly Vidal
*Director of the United States Patent and Trademark Office*